(12) United States Patent
Arimitsu et al.

(10) Patent No.: US 7,795,772 B2
(45) Date of Patent: Sep. 14, 2010

(54) MOTOR

(75) Inventors: Minoru Arimitsu, Kawasaki (JP); Kan Akatsu, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 265 days.

(21) Appl. No.: 12/121,901

(22) Filed: May 16, 2008

(65) Prior Publication Data

US 2008/0290753 A1   Nov. 27, 2008

(30) Foreign Application Priority Data

May 22, 2007   (JP)   ............................ 2007-135902

(51) Int. Cl.
*H02K 1/27*   (2006.01)
(52) U.S. Cl. ............................ 310/156.57; 310/156.53; 310/156.56
(58) Field of Classification Search ................................ 310/156.53–156.57
See application file for complete search history.

(56) References Cited

U.S. PATENT DOCUMENTS

| | | | | |
|---|---|---|---|---|
| 5,818,140 A | * | 10/1998 | Vagati | ........................ 310/185 |
| 5,945,760 A | * | 8/1999 | Honda et al. | ........... 310/156.53 |
| 6,121,736 A | * | 9/2000 | Narazaki et al. | ....... 318/400.35 |
| 6,734,592 B2 | * | 5/2004 | Tajima et al. | .......... 310/156.53 |
| 6,741,003 B2 | * | 5/2004 | Naito et al. | ............ 310/156.53 |
| 7,362,025 B2 | * | 4/2008 | Utaka | ..................... 310/156.57 |
| 7,474,029 B2 | * | 1/2009 | Rahman et al. | ........ 310/156.56 |
| 2004/0150282 A1 | * | 8/2004 | Murakami et al. | ..... 310/156.53 |
| 2006/0043812 A1 | * | 3/2006 | Cheong et al. | ......... 310/156.53 |
| 2006/0055267 A1 | | 3/2006 | Arimitsu et al. | |

FOREIGN PATENT DOCUMENTS

JP          2006-081338 A     3/2006

* cited by examiner

*Primary Examiner*—Tran N Nguyen
(74) *Attorney, Agent, or Firm*—Global IP Counselors, LLP

(57) ABSTRACT

A motor is basically provided with a stator, a rotor, a low permeability layer and a current control device. The stator includes a magnetic stator core and a stator winding. The rotor includes a rotor core and a plurality of permanent magnets arranged to form N and S poles of the rotor. The low permeability layer has a lower magnetic permeability than the rotor core and extends between each of the N and S poles in a direction generally parallel to the magnetic flux paths of the permanent magnets such that the permanent magnets and the low permeability are arranged to obstruct the magnetic flux between the N and S poles to provide a forward salient pole characteristic. The current control device produces a current whose phase is shifted such that the magnetic flux of the permanent magnets intensifies.

15 Claims, 12 Drawing Sheets

FIRST TYPE

SECOND TYPE

THIRD TYPE

MOTOR

CROSS-REFERENCE TO RELATED APPLICATIONS

This application claims priority to Japanese Patent Application No. 2007-135902, filed on May 22, 2007. The entire disclosure of Japanese Patent Application No. 2007-135902 is hereby incorporated herein by reference.

BACKGROUND OF THE INVENTION

1. Field of the Invention

The present invention generally relates to a motor. More specifically, the present invention relates to a motor that uses permanent magnets.

2. Background Information

A permanent magnet motor having a forward salient pole characteristic is known as an electric motor for use as a drive motor in electric vehicles. This permanent magnet motor has a so-called forward salient pole characteristic wherein a d-axis inductance is larger than a q-axis inductance. Such a permanent magnet motor having a forward salient pole characteristic is superior to a motor having a reverse salient pole characteristic with respect to achieving both high torque performance and high rotational speed performance with the same motor. One example of this kind of permanent magnet motor is disclosed in Japanese Laid-Open Patent Publication No. 2006-081338 (entitled "Rotor of Rotary Electric Machine").

In the permanent magnet motor having a forward salient pole characteristic as in disclosed in Japanese Laid-Open Patent Publication No. 2006-081338, the forward salient pole characteristic of the d-axis inductance being larger than the q-axis inductance is achieved by reducing the q-axis inductance. The q-axis inductance is lowered by adopting an interior permanent magnet (IPM) structure and forming a plurality of slits on a radially outward side of the permanent magnets. The slits are arranged to be parallel to the magnetic flux.

In view of the above, it will be apparent to those skilled in the art from this disclosure that there exists a need for an improved motor. This invention addresses this need in the art as well as other needs, which will become apparent to those skilled in the art from this disclosure.

SUMMARY OF THE INVENTION

It has been discovered that in a permanent magnet motor having a forward salient pole characteristic such as disclosed in Japanese Laid-Open Patent Publication No. 2006-081338, large magnets are required in order to achieve a given amount of magnetic flux because slits are formed in the magnetic flux paths of the permanent magnets.

One object of the present invention is to provide a motor that uses permanent magnets having a forward salient pole characteristic, such that large magnets are not required to achieve a given amount of magnetic flux, thus enabling the total magnet mass to be reduced.

In order to achieve the above mentioned object, a motor is basically provided that comprises a stator, a rotor, a low permeability layer and a current control device. The stator includes a magnetic stator core and a stator winding. The rotor includes a rotor core and a plurality of permanent magnets arranged to form N and S poles of the rotor. The low permeability layer has a lower magnetic permeability than the rotor core and extends between each of the N and S poles in a direction generally parallel to the magnetic flux paths of the permanent magnets such that the permanent magnets and the low permeability are arranged to obstruct the magnetic flux between the N and S poles to provide a forward salient pole characteristic. The current control device is configured to produce a current whose phase is shifted such that the magnetic flux of the permanent magnets increases.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 9A is a partial view of a seventh type, FIG. 9B showing a partial view of a eighth type, and FIG. 9C showing a partial view of a ninth type;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

FIRST EMBODIMENT

Figure 1:
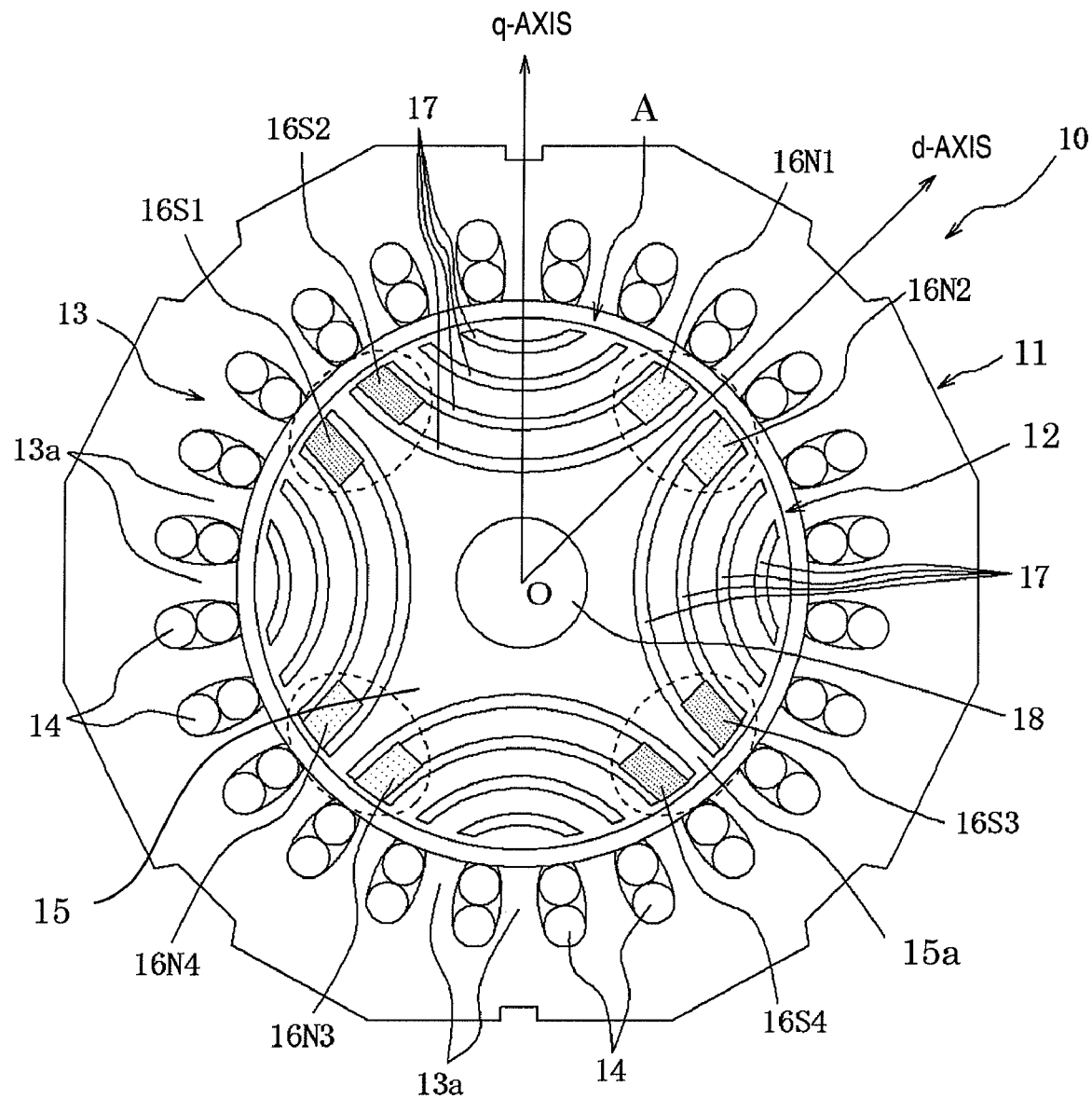
FIG. 1 is a diagrammatic view of a permanent magnet motor having a stator and a rotor of in accordance with a first embodiment.

Referring to FIG. 1, a permanent magnet motor 10 is diagrammatically illustrated in accordance with a first embodiment. As shown in FIG. 1, the motor 10 is a three-phase alternating current motor (permanent magnet motor) exemplifying a rotary electric machine that uses permanent magnets. The motor 10 has a stator 11 and a rotor 12 that are configured and arranged such that the opposing surfaces of the stator 11 and the rotor 12 are parallel to a center axis of the rotor 12 and an air gap A exists between the rotor 12 and the stator 11. The stator 11 comprises a stator core 13 and a stator winding 14. The rotor 12 comprises a plurality of permanent magnets 16, a plurality of low permeability layers 17 and a rotor shaft 18. The permanent magnets 16 are arranged in permanent magnet pairs or sets including alternating pairs of N pole permanent magnets and S pole permanent magnets, e.g., in this embodiment, two pairs of N pole permanent magnets and two pairs of S pole permanent magnets.

With the motor 10, as explained below, the magnetic resistance along the direction of the magnetic flux of the permanent magnets 16 is not increased and the magnetic flux of the permanent magnets 16 can be utilized effectively. As a result, the necessary magnetic flux can be secured without increasing the size of the permanent magnets 16 and the total magnet mass can be reduced because large magnets are not required in order to obtain the required amount of magnetic flux.

In particular, the low permeability layers 17 are configured and arranged with respect to the permanent magnets 16 to guide the magnetic flux of the permanent magnets 16 to a magnetic-line-of-force emanating surface. Preferably, at leas one of the low permeability layers 17 extends continuously between an adjacent pairs of the permanent magnets 16. Thus, the low permeability layers 17 obstruct the q-axis magnetic flux to provide a forward salient pole characteristic.

The stator core 13 has an annular shape with a plurality of teeth 13a (twenty four in this example) arranged around the internal circumferential surface thereof. Spaces (slots) exist between adjacent teeth 13a. The stator winding 14 is wound into the slots in a distributed manner (distributed winding). The stator core 13 is made, for example, of annular steel plates that have been stacked onto one another along the rotational axis direction. In the first embodiment, the teeth 13a of the stator core 13 are arranged such that each of the three phases (U phase, V phase, and W phase) uses two teeth 13a.

Similarly to the stator core 13, the rotor core 15 has a laminated steel plate structure comprising steel plates having a high magnetic permeability stacked onto one another so as to form a cylindrical body. The rotor core 15 has a total of eight permanent magnets 16 (16S1 to 16S4 and 16N1 to 16N4) that are arranged near the radially outward facing surface of the rotor 12 and aligned with one another along the circumferential direction of the rotor 12. In the first embodiment, openings are provided in the stator core 15 in the places where the permanent magnets 16 are to be arranged. The permanent magnets 16 are inserted into the openings along the axial direction so as to be in an embedded state.

Among the permanent magnets 16 arranged in the rotor 12, the permanent magnets 16S1 and 16S2 form a first S pole, the permanent magnets 16N1 and 16N2 form a first N pole, the permanent magnets 16S3 and 16S4 form a second S pole, and the permanent magnets 16N3 and 16N4 form a second N pole. Thus, the permanent magnets 16 are arranged in the rotor 12 so as to form four magnetic poles, i.e., two magnetic pole pairs. In the first embodiment, the permanent magnets 16 are magnetized in the d-axis direction shown in FIG. 1.

As mentioned above, the rotor 12 is also provided with the low permeability layers 17. In the first embodiment, the low permeability layers 17 are air layers formed by making slits in the rotor core 15. The low permeability layers 17 are configured and arranged to follow along the contour of (be generally parallel to) the magnetic flux paths of the permanent magnets 16. In other words, the low permeability layers 17 do not intersect with the d-axis direction (which is the direction of the magnetic flux of the permanent magnets 16), but do intersect with the q-axis direction (which is a direction perpendicular to the direction of the magnetic flux of the permanent magnets 16). The low permeability layers 17 are arranged in a plurality of rows (see FIG. 1). Each of the permanent magnets 16 is arranged to be sandwiched between two adjacent low permeability layers 17. In other words, the low permeability layers 17 are arranged and configured to separate the regions of the rotor core 15 that serve as magnetic flux paths from other regions of the rotor core 15 that do not serve as magnetic flux paths. The regions of the rotor core 15 defined to be magnetic flux paths will hereinafter be called rotor core magnetic flux paths 15a.

In the first embodiment, the regions that do not serve as magnetic flux paths of the rotor core 15 are formed to be adjacent to the rotor core magnetic flux paths 15a and arranged to form paths leading from one place on the surface of the rotary core 15 to another place. The entrances and exits of these non-magnetic flux paths are positioned near the N poles and near the S poles formed by the permanent magnets 16. In FIG. 1, these paths correspond to the plurality of paths formed between the permanent magnets 16, e.g., between the permanent magnet 16S1 and the permanent magnet 16S2 and between the permanent magnet 16S2 and the permanent magnet 16N1.

Figure 2:
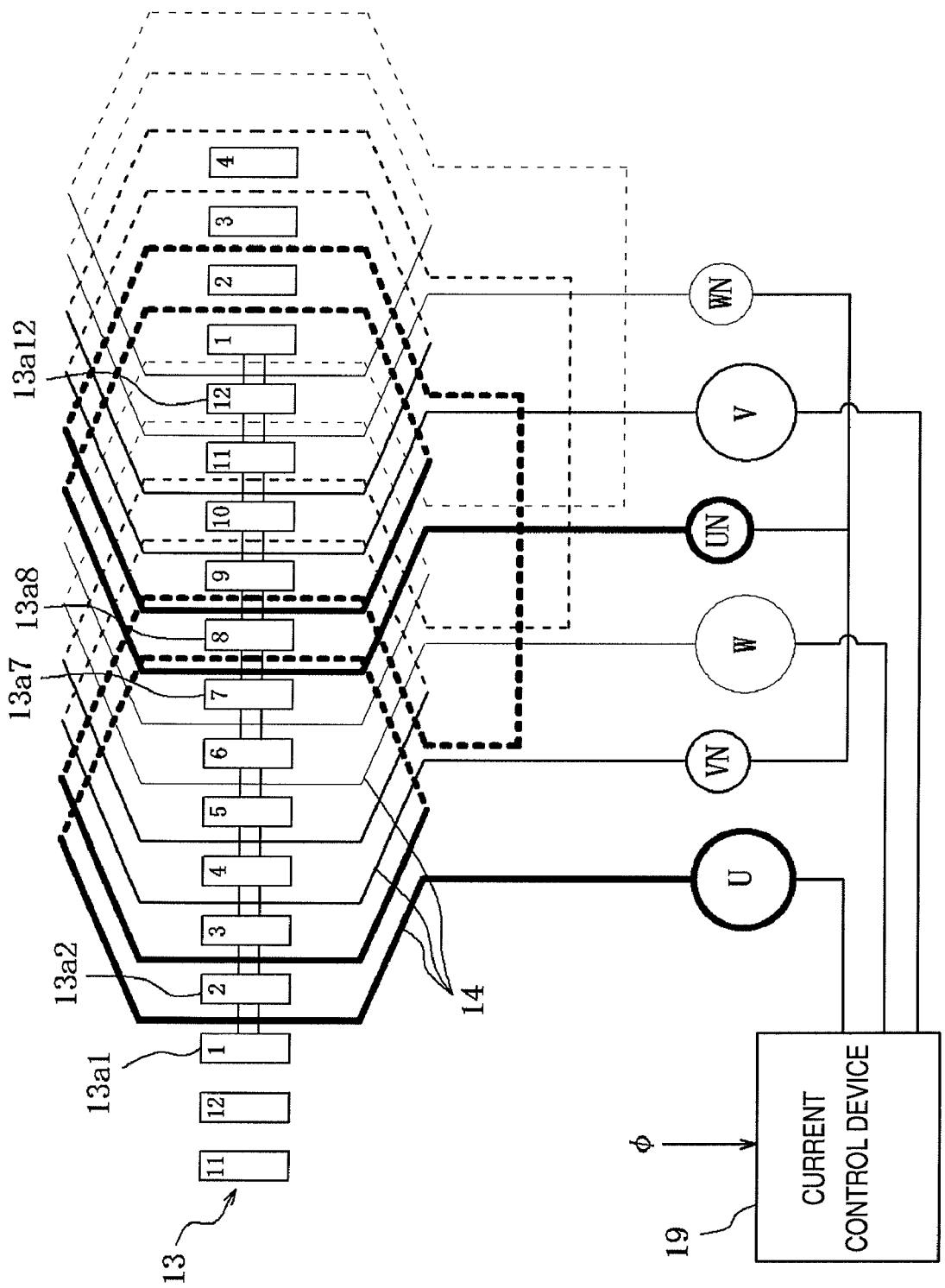
FIG. 2 is a drawing for explaining the phase configuration of the stator winding shown in FIG. 1.

FIG. 2 is a drawing for explaining the phase configuration of the stator winding shown in FIG. 1. As shown in FIG. 2, the stator wiring 14 supplies three phases of current (U phase, V phase, and W phase) per two poles (per pole pair). One phase is formed by two teeth 13a of the stator core 13. The stator winding 14 is a distributed winding wound such that, for example, current flows through both of an adjacent pair of U phases (tooth 13a1 and tooth 13a2) in a same direction and current flows through both of a next adjacent pair of U phases (tooth 13a7 and tooth 13a8) in a same direction that is opposite the direction in which current flows through the previous pair of U phases (tooth 13a1 and 13a2).

One end of each phase of the stator winding 14 is connected to a current control device 19 and the other end is connected to a neutral point. Although FIG. 2 shows the stator winding 14 for two poles (one pole pair), the rotor 12 has a four pole (two pole pair) configuration, and thus, the stator winding 14 actually comprises twice as much wiring as is shown. In other words, although FIG. 2 shows the stator winding 14 corresponding to twelve of the teeth 13a (13a1 to 13a12), the stator winding 14 is actually wound around twenty four teeth 13a.

The current control device 19 supplies three-phase alternating current in synchronization with the rotation of the rotor 12. The current control device 19 employs a rotation sensor (not shown in figures) to detect the rotational position of the rotor 12 and supplies electric current in accordance with the detected position so as to generate a rotary electric field in the stator 11. Basically, the current control device 19 is configured to execute a phase control to shift a phase of an electric current passing through the stator winding 14 in such a direction that the magnetic flux of the permanent magnets 19 increases.

The magnetic characteristics of the rotor 12 will now be explained. As is clear from FIG. 1, assuming the resistance of an electric path formed by the electromagnetic steel plates is 0 and the resistance of the permanent magnets 16 and the low permeability layers (air) 17 is 1, then the only magnetic resistance of a magnetic path oriented in the d-axis direction shown in FIG. 1 is the magnetic resistance of the permanent magnets 16. Moreover, a region in which the magnetic resistance is 0 also exists between the permanent magnets 16S1 and 16S2. Meanwhile, there are several low permeability layers 17 in a magnetic path oriented in the q-axis direction, and thus, the magnetic resistance of the magnetic path is high. The actual size of the magnetic resistance depends on the width and number of the low permeability layers 17 and the thickness of the magnets 16, but it is clear that the magnetic resistance in the q-axis direction is higher than the magnetic resistance in the d-axis direction.

Since the magnetic resistance in the q-axis direction is higher than the magnetic resistance in the d-axis direction, the magnetic circuit of the rotor 12 in this embodiment is a forward salient pole type magnetic circuit, which is formed in which magnetic body salient poles exist in the vicinity of the d-axes. This is different than a reverse salient pole type magnetic circuit in which magnetic body salient poles exist between magnetic poles (i.e., between d-axes), as is the case in a typical rotor.

Since chiefly the regions other than the magnetic flux paths of the rotor core 15, i.e., chiefly the regions spanning from the S poles to the N poles formed by the permanent magnets 16, are used as the magnetic body salient poles, the magnetic flux paths of the permanent magnets 16 do not cross the magnetic flux paths of the magnetic body salient poles and the magnetic flux paths do not become saturated. Furthermore, the salient pole ratio of the forward salient pole characteristic can be improved.

A detailed explanation of the characteristics of a forward salient pole magnetic circuit will not be provided here since forward salient pole magnetic circuits are known to those skilled in the art. However, in brief, when reluctance torque is used in a typical motor having a reverse salient pole characteristic, a magnetic field is applied against the permanent magnets in the weak magnetic field direction. Conversely, when reluctance torque is used in a motor having a forward salient pole characteristic, the magnetic field is applied against the permanent magnets in the intensified magnetic field direction.

In a motor having a forward salient pole characteristic, it is feasible to control the intensified magnetic field direction so as to obtain a high torque during low rotational speeds and to stop the intensified magnetic field control when the induced voltage increases due to higher rotational speeds.

In other words, in order to obtain the same performance as a typical reverse salient pole type motor, a forward salient pole type motor can be designed to have smaller magnets than the comparable reverse salient pole type motor and the smaller magnets (smaller magnet mass) can be compensated for by executing intensified magnetic field control when the forward salient pole type motor is operated in a low rotational speed, high torque region so as to obtain a large torque output. Meanwhile, high rotational speed performance can be achieved by stopping the intensified magnetic field control when the forward salient pole type motor is operated at high rotational speeds. Since the total magnet mass is smaller than in the comparable reverse salient pole type motor, the induced voltage is smaller and torque can be output in a continuous fashion even in the weak magnetic field region where the comparable reverse salient pole type motor is operated. Thus, a forward salient pole type motor is advantageous because the size (mass) of magnets used can be reduced.

Figure 3:
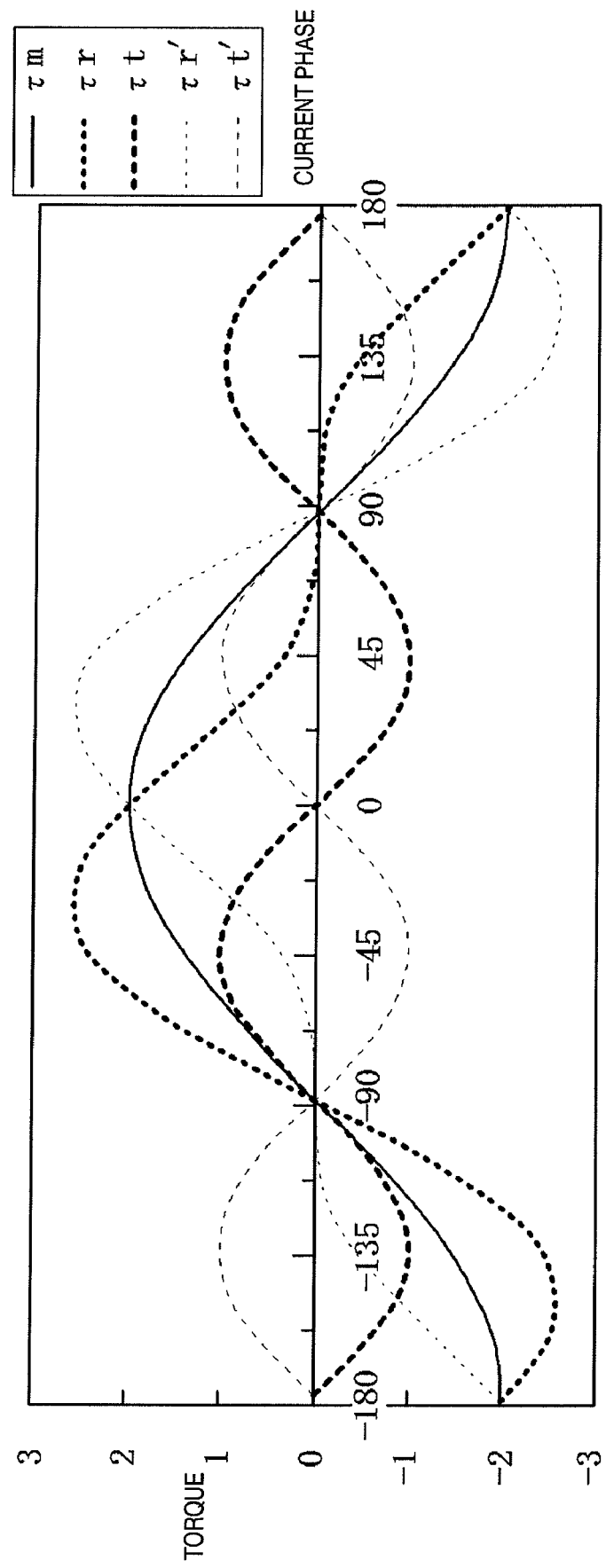
FIG. 3 is a graph showing the torque versus the current phase in the permanent magnet motor shown in FIG. 1.

FIG. 3 is a graph showing the torque versus the current phase in the permanent magnet motor 10 shown in FIG. 1. In FIG. 3, $\tau m$ is the magnet torque, $\tau r$ is the reluctance torque, $\tau t$ is the resultant torque of the magnet torque and the reluctance torque, $\tau r'$ is the reluctance torque for the case of a reverse salient pole characteristic, and $\tau t'$ is the resultant torque of the magnet torque and the reluctance torque for the case of a reverse salient pole characteristic. The torques $\tau m$, $\tau r$, and $\tau t$ indicate torques of a motor (forward salient pole motor) in accordance with the first embodiment, and $\tau r'$ and $\tau t'$ indicate torques of a conventional motor (reverse salient pole motor).

In FIG. 3, the maximum value of the magnet torque $\tau m$ is depicted to be 2 and the maximum value of the reluctance torque $\tau r$ is depicted to be 1 for convenience. However, the actual torque values depend on the amount of current supplied and such magnetic properties of the motor as the magnet size (total magnet mass) and the salient pole ratio.

The torque of the permanent magnet motor 10 in accordance with the first embodiment is largest (maximum) when the current phase is in the vicinity of −30 degrees, and the torque of the reverse salient pole type motor is largest when the current phase is in the vicinity of 30 degrees. Although the maximum torque can be increased further by increasing the current, the amount by which the current can be increased is limited in the case of the reverse salient pole type motor. More specifically, when the maximum torque occurs at a current phase of 30 degrees, a magnetic field is applied to the permanent magnets 16 in such a manner that a weak magnetic field is formed. Consequently, the amount by which the current is increased must be limited in order to avoid permanent demagnetization of the permanent magnets 16.

Conversely, in the first embodiment, the maximum current occurs when the current phase is in the vicinity of −30 degrees and a magnetic field is applied against the permanent magnets 16 in the intensified magnetic field direction. Therefore, the current can be increased without the risk of causing permanent demagnetization.

Based on the plots shown in FIG. 3, the current control device 19 shifts the current phase in the negative direction when maximum torque is to be produced. Shifting the current phase in the negative direction enables a magnetic field to be applied against the permanent magnets 16 in the intensified magnetic field direction while delivering maximum torque.

Effects obtained with a permanent magnet motor 10 in accordance with the first embodiment will now be explained.

By arranging the permanent magnets 16 in core areas disposed (sandwiched) between low permeability layers, a forward salient pole type magnetic circuit can be constructed in which the low permeability layers 17 are not arranged in the path of the magnetic flux produced by the permanent magnets 16. As a result, magnetic torque can be utilized effectively without unnecessarily increasing the total magnet mass.

In addition, with the permanent magnets 16 being arranged in core areas disposed (sandwiched) between low permeability layers 17, there are adjacent core areas in which permanent magnets are not arranged and which are arranged and configured lead from one place on the surface of the rotor to another place. As a result, the magnetic flux paths of the permanent magnets 16 do not cross the magnetic flux paths of the magnetic body salient poles and the magnetic flux paths can be prevented from becoming saturated even when a large current is supplied to the stator winding 14.

Second Embodiment

Figure 4:
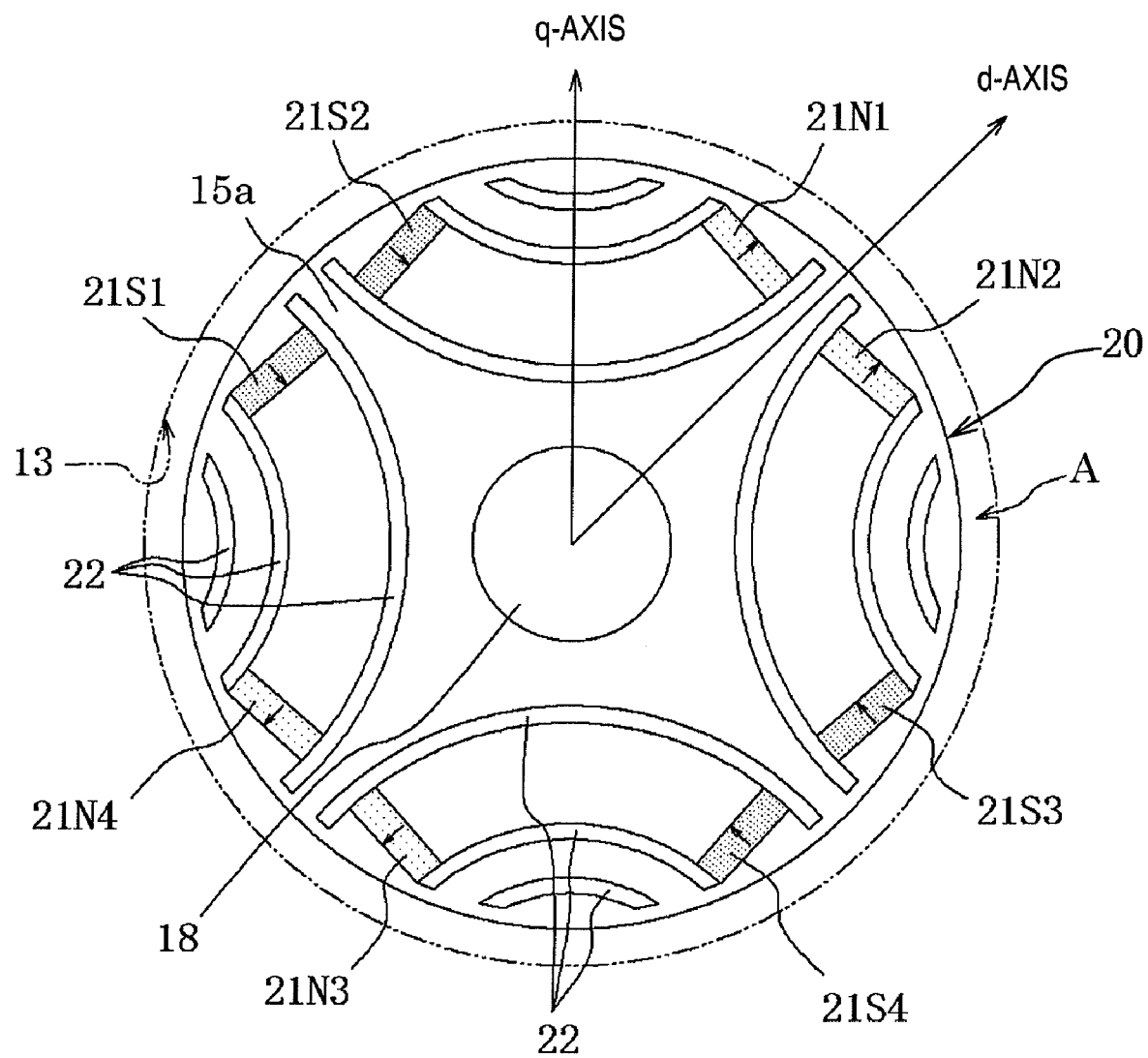
FIG. 4 is a diagrammatic view of a rotor of a permanent magnet motor in accordance with a second embodiment.

FIG. 4 is a diagrammatic view of a rotor of a permanent magnet motor in accordance with a second embodiment. As shown in FIG. 4, the rotor 20 of a permanent magnet motor of this second embodiment has thin permanent magnets 21 (21S1 to 21S4 and 21N1 to 21N4) arranged near the surface of the stator core 15 and low permeability layers 22 comprising adhesive layers made by filling air layers with an adhesive material. Otherwise, the constituent features and operational effects are the same as those of the rotor 12 (see FIG. 1) of the first embodiment. Explanations of parts that are the same as the parts of the first embodiment shown in FIG. 1 are omitted for the sake of brevity.

In the second embodiment, the permanent magnets 21 are arranged near the radially outward facing surface of the rotor 15, i.e., close to the surface that faces the stator core 13, and are thinner than the magnets of the rotor 12 in the first embodiment. In general, a permanent magnet is configured to have a large dimension in the magnetization direction. This is done more for the purpose of preserving the magnetic force (preventing demagnetization) than to intensify the magnetic flux of the magnet. In a forward salient pole type motor in accordance with this embodiment, the permanent magnets 21 can be configured to have a thin profile because operation of the motor with a magnetic field applied in the weak magnetic field direction is avoided as much as possible, and thus, demagnetization of the permanent magnets can be avoided. With regards to reducing the size of the magnets (magnet mass), reducing in the thickness direction of the rotor 20 is advantageous from the standpoint of maintaining the magnetic flux. Additionally, the mass of the rotor 20 is smaller than the mass of a typical reverse salient pole type motor because the total magnet mass is smaller. Since the magnets can be prevented from scattering during high speed rotation, this embodiment is also advantageous in terms of the strength required for higher rotational speeds.

Also, in this embodiment, the low permeability layers 22 comprise adhesive layers made by filling air layers with an adhesive material. Although the adhesive has a slightly smaller magnetic resistance than air, the adhesive filled layers are advantageous with respect to high speed rotation because they strengthen the rotor core 15 and make it in to a solid unit.

Figure 5:
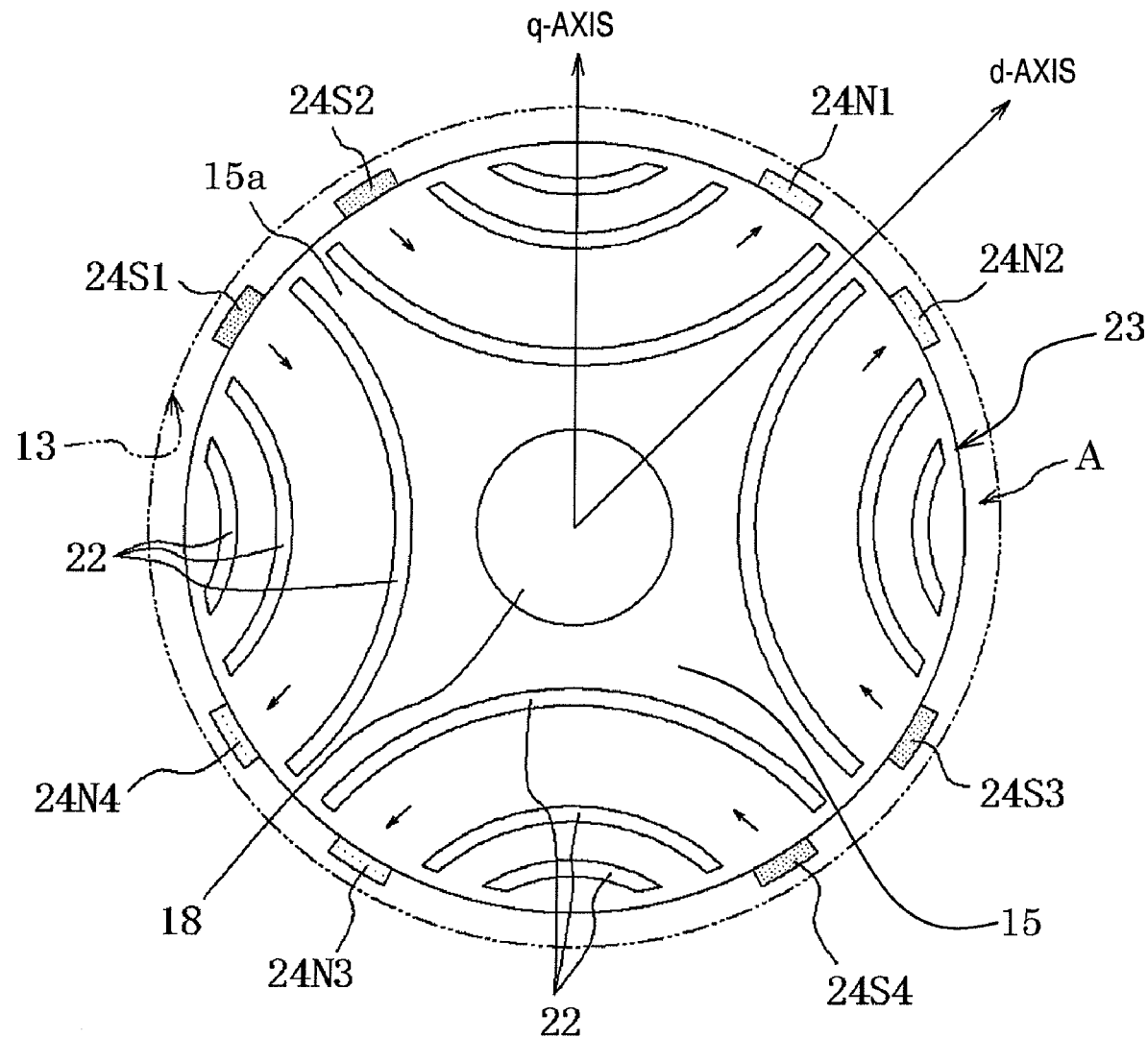
FIG. 5 is a diagrammatic view of a rotor in accordance with a variation of the second embodiment.

A variation of the second embodiment can be achieved by providing the permanent magnets as surface mounted magnets. FIG. 5 is a diagrammatic view of a rotor in accordance with a variation of the second embodiment. As shown in FIG. 5, in this variation, the rotor 23 has permanent magnets 24 (24S1 to 24S4 and 24N1 to 24N4) arranged on the radially outward facing surface of the rotor core 15, i.e., on the surface that faces the stator core 13, i.e., the surface that faces the air gap A between the rotor 23 and the stator 11 (see FIG. 1).

By adopting a surface magnet configuration, the total magnet mass can be reduced, and thus, the gap between the stator 11 and the permanent magnets 24 can be reduced. With this embodiment, since the size of the magnets 24 can be reduced, the magnet mass can be reduced and the magnets 24 will not scatter. As a result, the surface magnet structure can be used in motors intended for operation at higher rotational speeds than conventional motors.

Effects obtained with a rotor in accordance with the second embodiment will now be explained. These effects are in addition to the effects obtained with a rotor in accordance with the first embodiment.

Since the size of the magnets 24 is reduced, the magnet mass is smaller and a rotor suited for operation at higher rotational speeds can be obtained.

Since the low permeability layers 22 are made by filling air layers with an adhesive material, the effects of stress concentrations in the rotor 23 core can be alleviated and a rotor suited for operation at higher rotational speeds can be obtained.

Third Embodiment

Figure 6:
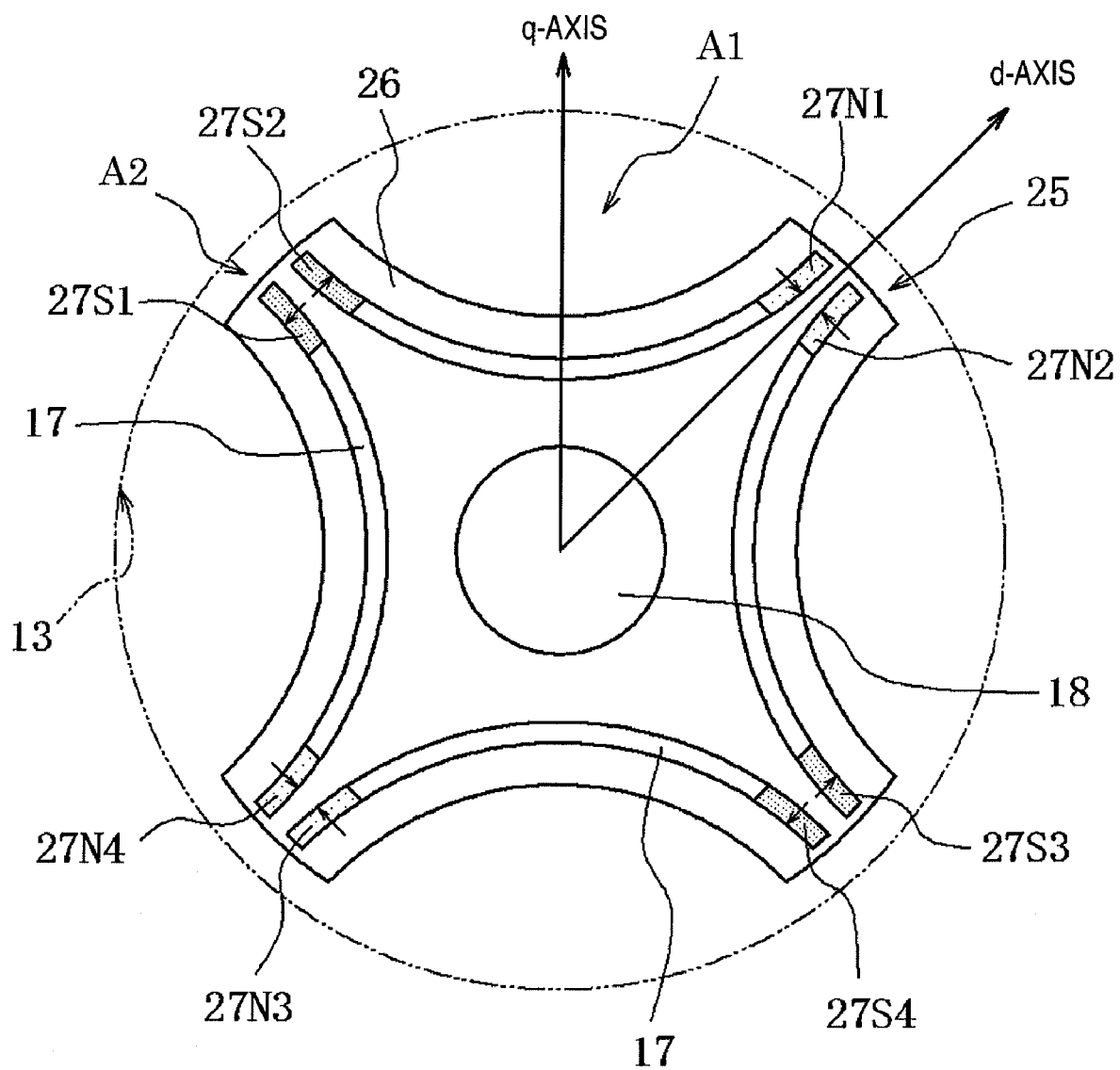
FIG. 6 is a diagrammatic view of a rotor of a permanent magnet motor in accordance with a third embodiment.

FIG. 6 is a diagrammatic view of a rotor of a permanent magnet motor in accordance with a third embodiment. As shown in FIG. 6, the rotor 25 of a permanent magnet motor of this third embodiment has a rotary core 26 that is star-shaped in a plan view and plate-like permanent magnets 27 (27S1 to 27S4 and 27N1 to 27N4) that are arranged near the surface of the rotor core 26. Otherwise, the constituent features and operational effects are the same as those of the rotor 12 (see FIG. 1) of the first embodiment. Explanations of parts that are the same as the parts of the first embodiment shown in FIG. 1 are omitted for the sake of brevity.

The shape of the rotor core 26 of this rotor 25 is obtained by removing portions of the circular rotor core 15 (see FIG. 1) corresponding to the q-axis direction such that the air gap A1 in the vicinity of the q-axis is larger than the air gap A2 in the vicinity of the d-axis. In other words, the rotor core 26 is shaped like a four-pointed start in a top plan view. More specifically, the air gap distance between the stator 13 and a magnetic flux emanation surface formed by the permanent magnets 27 on the surface of the rotor 25 is smaller than the air gap distance between the stator 13 and portions of the rotor 25 other than the magnetic flux emanation surface.

In this embodiment, the rotor core 26 is configured such that the magnetic path in the q-axis direction is almost entirely occupied by air. As a result, the magnetic resistance in the q-axis direction is large, and thus, a forward salient pole type magnetic circuit can be formed.

In this embodiment, the permanent magnets 27 are arranged near the surfaces of the rotor 25 that face the stator core 13 so as to occupy portions of the low-permeability layers 17. In order to ensure that the permanent magnets 27 have the required size (mass), the permanent magnets 27 are formed into plate-like shapes that generally follow the contour of the low permeability layers 17 and arranged inside the low permeability layers 17. The permanent magnets 27 are magnetized in a direction that intersects with (e.g., substantially perpendicularly) the arrangement direction of the low permeability layers 17.

Effects obtained with a rotor in accordance with the third embodiment will now be explained. These effects are in addition to the effects obtained with a rotor in accordance with the first embodiment.

Since the air gap A1 is provided in the q-axis direction, the magnetic resistance in the q-axis direction can be increased and the salient pole ratio of the forward salient pole type motor can be increased.

Since the permanent magnets 27 are arranged inside the low permeability layers 27, the magnetic resistance in the d-axis direction can be made even smaller.

Fourth Embodiment

Figure 7A:
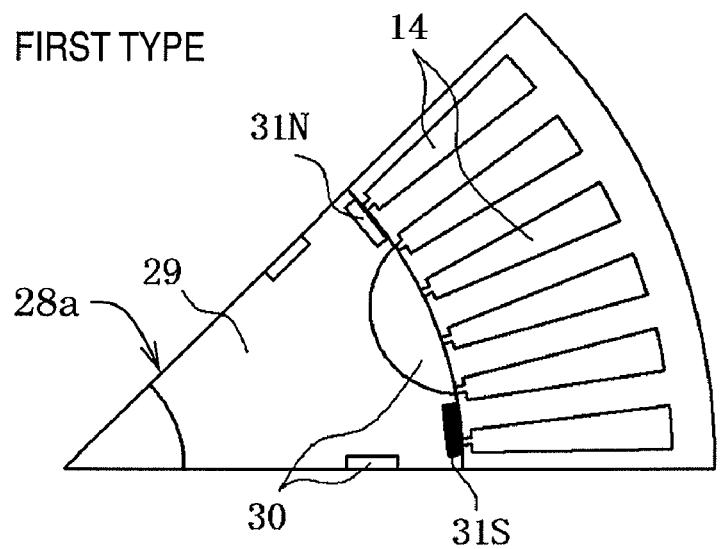
FIGS. 7A, 7B and 7C shows a first group of rotors for a permanent magnet motor in accordance with a fourth embodiment, FIG. 7A showing a partial view of a first type, FIG. 7B showing a partial view of a second type, and FIG. 7C showing a partial view of a third type.
Figure 7B:
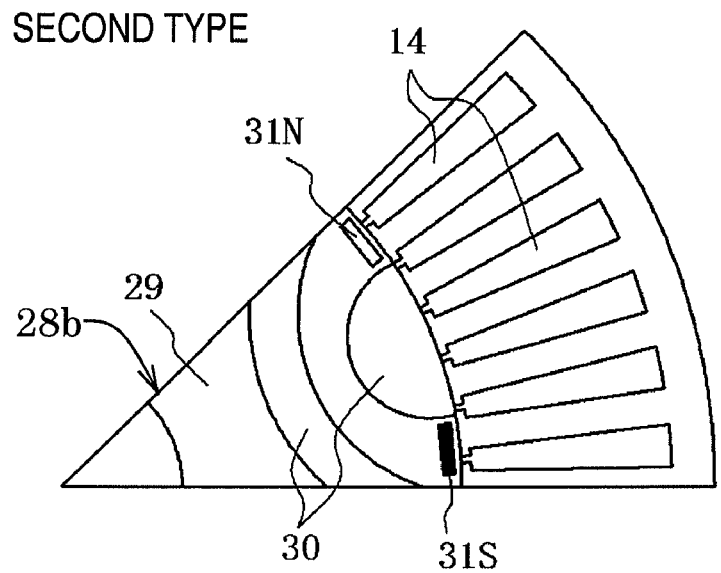
Figure 7C:
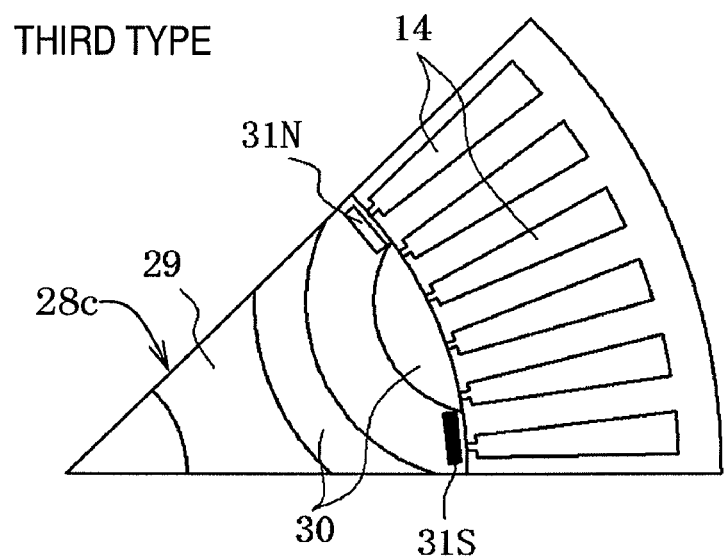
Figure 8A:
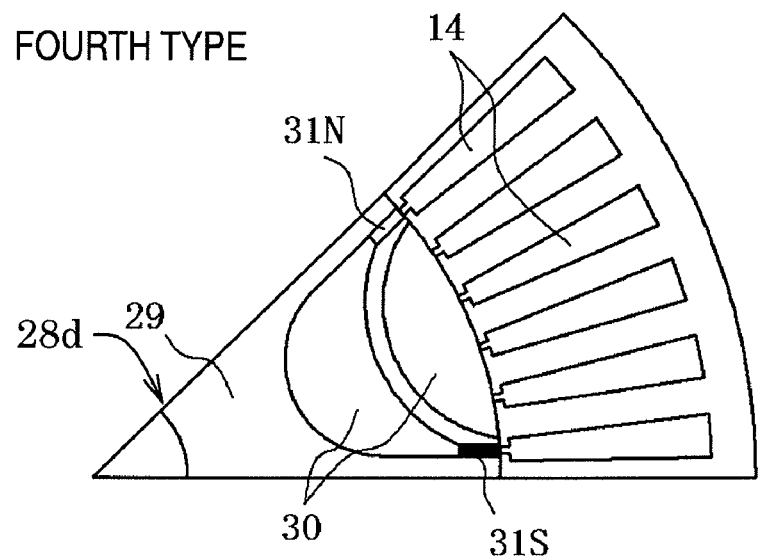
FIGS. 8A, 8B and 8C shows a second group of rotors for a permanent magnet motor in accordance with a fourth embodiment, with FIG. 8A is a partial view of a fourth type, FIG. 8B showing a partial view of a fifth type, and FIG. 8C showing a partial view of a sixth type.
Figure 8B:
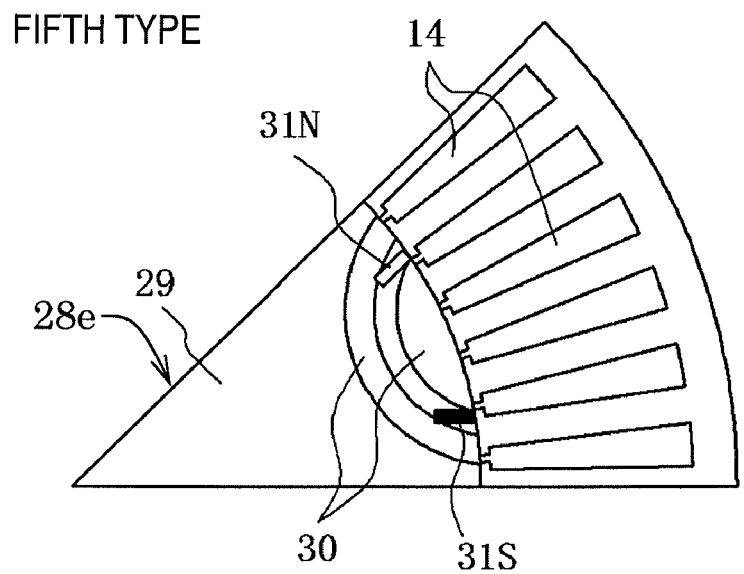
Figure 8C:
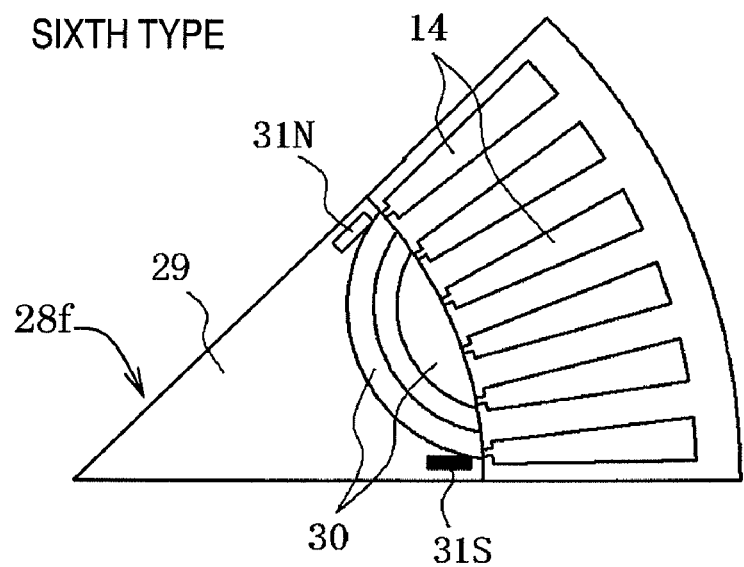
Figure 9A:
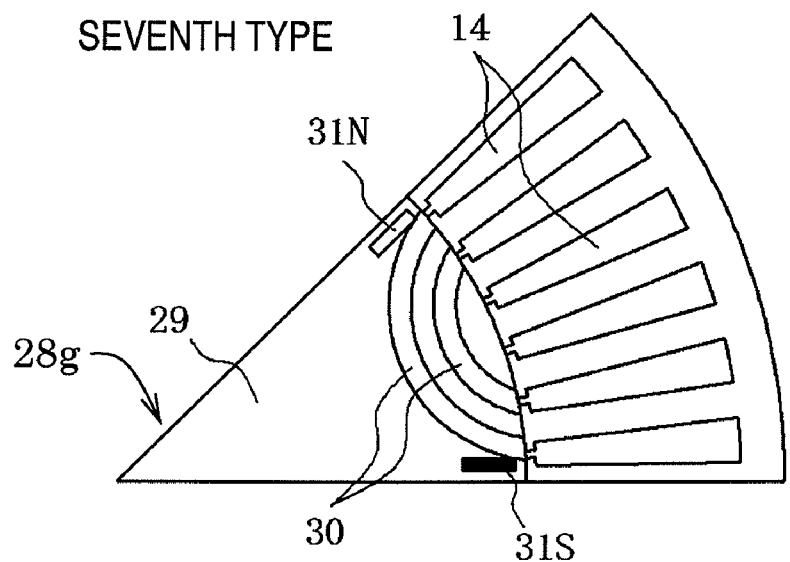
FIG. 9A, 9B and 9C shows a third group of rotors for a permanent magnet motor in accordance with a fourth embodiment.
Figure 9B:
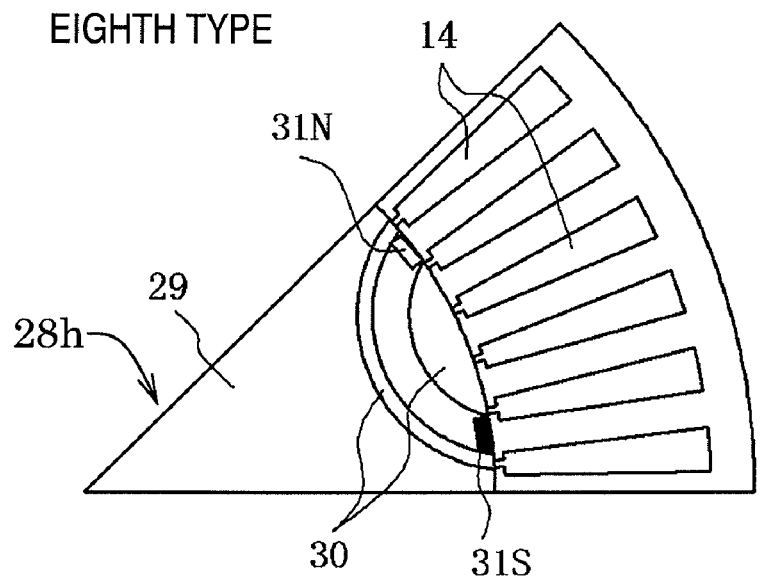
Figure 9C:
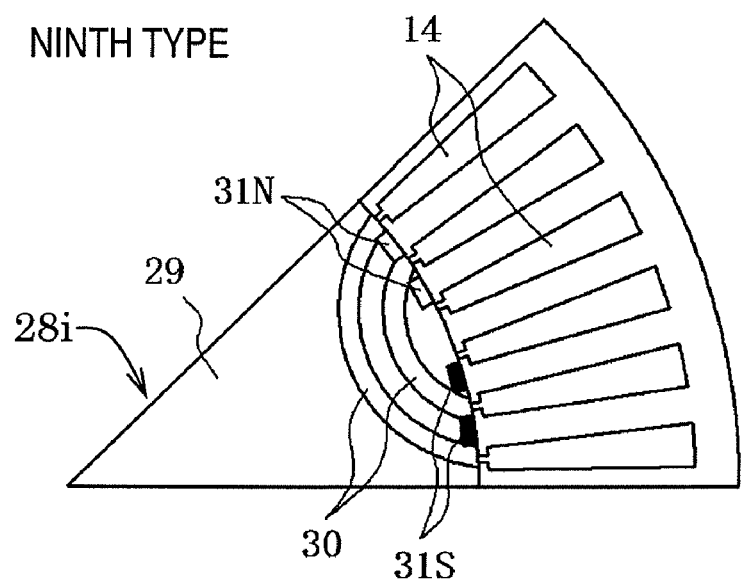

FIGS. 7A, 7B and 7C shows different types (a first group) of rotors for a permanent magnet motor in accordance with a fourth embodiment. FIG. 7A is a partial view of a first type of rotor, FIG. 7B is a partial view of a second type of rotor, and FIG. 7C is a partial view of a third type of rotor. FIG. 8 shows different types (a second group) of rotors for a permanent magnet motor in accordance with the fourth embodiment of. FIG. 8A is a partial view of a fourth type of rotor, FIG. 8B is a partial view of a fifth type of rotor, and FIG. 8C is a partial view of a sixth type of rotor. FIG. 9 shows different types (a third group) of rotors for a permanent magnet motor in accordance with a fourth embodiment. FIG. 9A is a partial view of a seventh type of rotor, FIG. 9B is a partial view of an eighth type of rotor, and FIG. 9C is a partial view of a ninth type of rotor.

In the first to third embodiments, a permanent magnet motor having a forward salient pole characteristic is obtained by increasing the magnetic resistance in the q-axis direction. In the fourth embodiment, in addition to increasing the magnetic resistance in the q-axis direction, the magnetic resistance in the d-axis direction is decreased in order to obtain a forward salient pole type permanent magnet motor with an even larger salient pole ratio.

In a typical reverse salient pole type motor, a magnetic body salient pole exists between adjacent d-axes, i.e., in the directions of the q-axes. Such a motor is designed to have a small magnetic resistance in the q-axis direction such that a large salient pole ratio can be obtained, and thus, a large reluctance torque can be obtained.

However, in a forward salient pole type motor, the magnetic resistance in the q-direction is increased, and thus, a magnetic body salient pole exists in the d-axis direction. Consequently, conversely to a reverse salient pole type motor, a forward salient pole type motor is designed to have a small magnetic resistance in the d-axis direction such that the salient pole ratio can be increased, and thus, a large reluctance torque can be obtained.

Additionally, when increasing the salient pole ratio of a forward salient pole type motor, it is necessary to design the motor such that the magnetic resistance in the d-axis direction is reduced without reducing the magnetic flux. Otherwise, if the magnetic flux is not maintained, then the magnet torque will decline.

FIGS. 7A to 9C each show a section of the rotor that spans from one d-axis to another d-axis. The first to third types of rotors $28a$ to $28c$ shown in FIGS. 7A 7B and 7C are intended to ensure a large magnetic flux. In order to increase the magnetic resistance in the q-axis direction, air layers 30 are provided along the q-axis direction of the rotor core 29, which is made of steel plates. The air gap in the vicinity of the q-axis is large (see third embodiment). In order to decrease the magnetic resistance in the d-axis direction, the permanent magnets 31 (31N and 31S) are separated onto both sides of the d-axes and no magnets are arranged directly on the d-axes. The permanent magnets 31 are large in the widthwise direction (i.e., the circumferential direction of the rotor), but small in the thickness direction (i.e., the radial direction of the rotor) such that the magnetic resistance caused by the thickness of the magnets is small. With the first to third types of rotor $28a$ to $28c$, a large magnetic flux (Wb) can be secured because the widths of the magnets are large.

In general, the thickness of a permanent magnet in the magnetization direction does little to increase the magnetic flux and the surface area in the flux direction is the dominant factor with respect to magnetic flux. However, the thickness of a permanent magnet is important from the standpoint of the coercive force of the magnet (i.e., preventing demagnetization). In a forward salient pole type motor, the magnets can be configured to have a thin profile because operation of the motor with a magnetic field applied in the weak magnetic field direction is avoided as much as possible, and thus, demagnetization of the permanent magnets can be avoided.

The fourth to seventh types of rotors $28d$ to $28g$ shown in FIGS. 8A 8B and 8C and FIG. 9A are intended to obtain a large salient pole ratio. Similarly to the first to third types of rotors $28a$ to $28c$, the air gap is large in the vicinity of the q-axis in order to increase the magnetic resistance in the q-axis direction (see third embodiment). Additionally, the permanent magnets 31 are arranged to be generally parallel to the d-axis such that the surface area of the permanent magnets 31 on a magnetic path in the d-axis direction is reduced.

In addition to the path through which the magnetic flux passes, a d-axis magnetic path is provided in which a permanent magnet is not arranged. As a result, the magnetic resistance in the d-axis direction can be greatly reduced, and thus, the salient pole ratio can be increased. Also, similarly to the first to third types of rotors $28a$ to $28c$, the permanent magnets are separated onto both sides of the d-axes and no magnets are 1 arranged directly on the d-axes. Therefore, the regions in the vicinity of the d-axes can be used as magnetic paths.

Although it is difficult to secure a large magnetic flux with the fourth to seventh types of rotor $28d$ to $28g$, the magnetic flux can be increased by arranging the magnets 31 as closely as possible to the surface, as illustrated with the fourth type of rotor $28d$. Similarly to the first to third types of rotors $28a$ to $28c$, thinner permanent magnets can be used by controlling the motor such that weak magnetic field operation is avoided.

The eight and ninth types of rotors $28h$ and $28i$ are designed to both secure a large magnetic flux and achieve a large salient pole ratio. A larger magnet surface area is secured by arranging the magnets perpendicularly with respect to the d-axes as described regarding the first to third types of rotors $28a$ to $28c$, and at least one d-axis magnetic path in which a permanent magnet is not arranged is provided as described regarding the fourth to seventh types of rotors $28d$ to $28g$.

Figure 10:
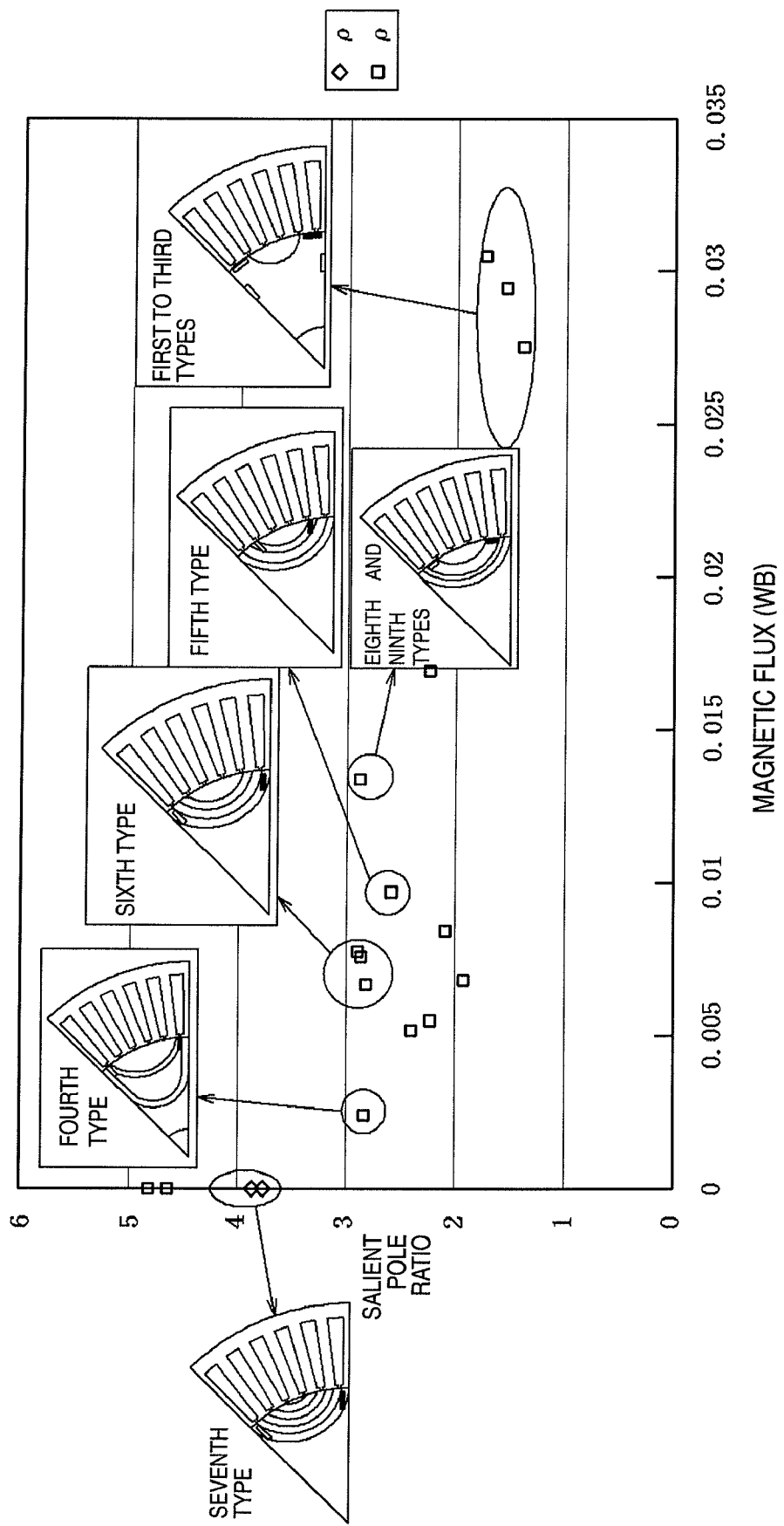
FIG. 10 is a graph plotting the salient pole ratio versus the magnetic flux density for the different types of rotors shown in FIGS. 7 to 9.

FIG. 10 is a graph plotting the salient pole ratio versus the magnetic flux density for the different types of rotors shown in FIGS. 7 to 9. FIG. 10 illustrates what is explained above regarding the different types of rotors. Namely, the first type of rotor $28a$ can secure a large magnetic flux and the fourth type of rotor $28d$ can secure a large salient pole ratio. The seventh type of rotor $28g$ can secure both a large salient pole ratio and a large magnetic flux.

Figure 11:
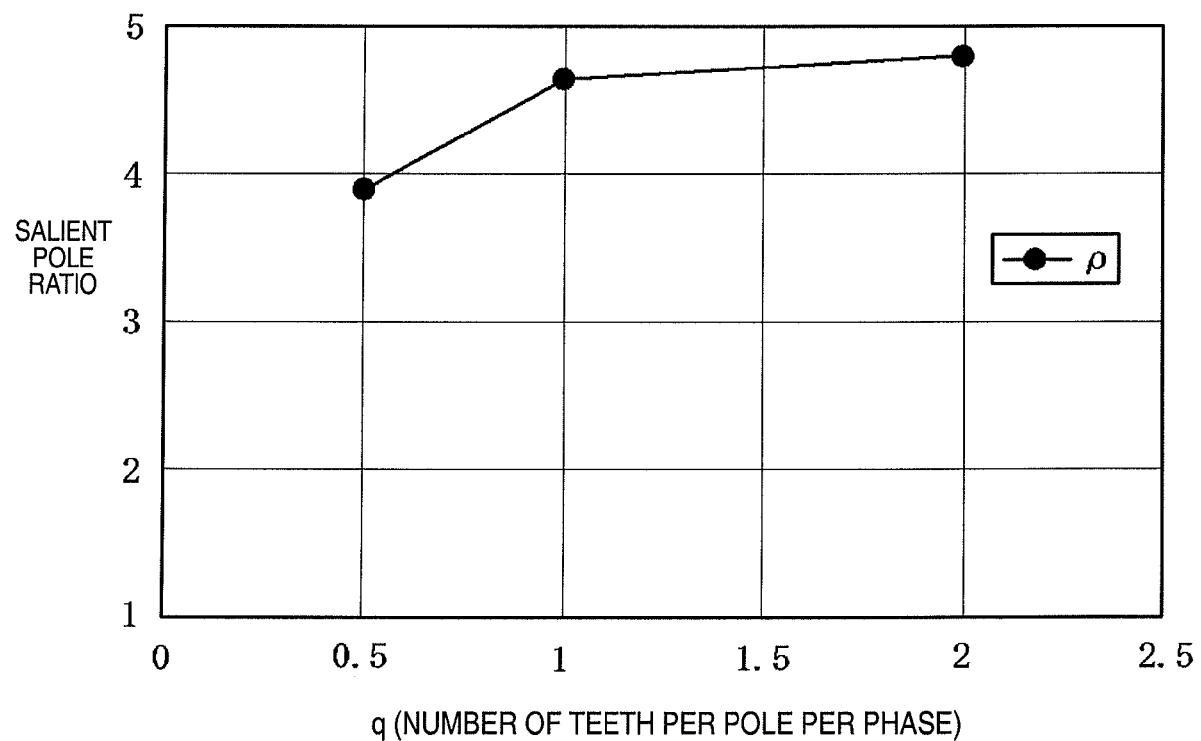
FIG. 11 is a graph plotting the salient pole ratio versus the stator tooth count for the different types of rotors shown in FIGS. 7 to 9.

FIG. 11 is a graph plotting the salient pole ratio versus the stator tooth count for the different types of rotors shown in FIGS. 7 to 9. FIG. 11 plots the salient pole ratio for tooth counts ranging from 0.5 to 2 teeth per phase per pole. As shown in FIG. 11, the salient pole ratio of, for example, the seventh type of rotor $28g$ increases when the number of teeth per pole per phase is 2. Since salient pole ratio does not increase much when the number of teeth per pole per phase is increased from 1 to 2 and since it is difficult to manufacture tooth counts larger than 2, it is preferable to have a tooth count of 2 per pole per phase.

Effects obtained with a rotor in accordance with the fourth embodiment will now be explained.

These effects are in addition to the effects obtained with a rotor in accordance with the first embodiment, the second embodiment, or the third embodiment.

By arranging the magnets such that they are separated by the d-axis, a d-axis magnetic path having a small magnetic resistance can be formed in the close vicinity of the d-axis and the salient pole ratio can be increased.

By providing a d-axis magnetic path in which no permanent magnets are arranged, the magnetic resistance of the magnetic path can be decreased and the salient pole ratio can be increased.

By arranging the permanent magnets 31 to be generally parallel to the d-axis magnetic path, the magnetic resistance of the magnetic path caused by the permanent magnets 31 can be reduced, the magnetic resistance of the magnetic path can be increased, and the salient pole ratio can be increased.

By arranging the permanent magnets 31 to be generally perpendicular to the d-axis magnetic path and configuring the permanent magnets 31 to be small (thin) in the thickness direction and large (wide) in the widthwise direction, a large magnetic flux and a high salient pole ratio can be obtained simultaneously. More specifically, the large width of the permanent magnets 31 increases the magnetic flux and the small thickness of the permanent magnets 31 reduces the magnetic resistance in the d-axis magnetic path.

By setting the number of stator teeth per pole per phase to 2, the salient pole ratio can be increased.

Figure 12:
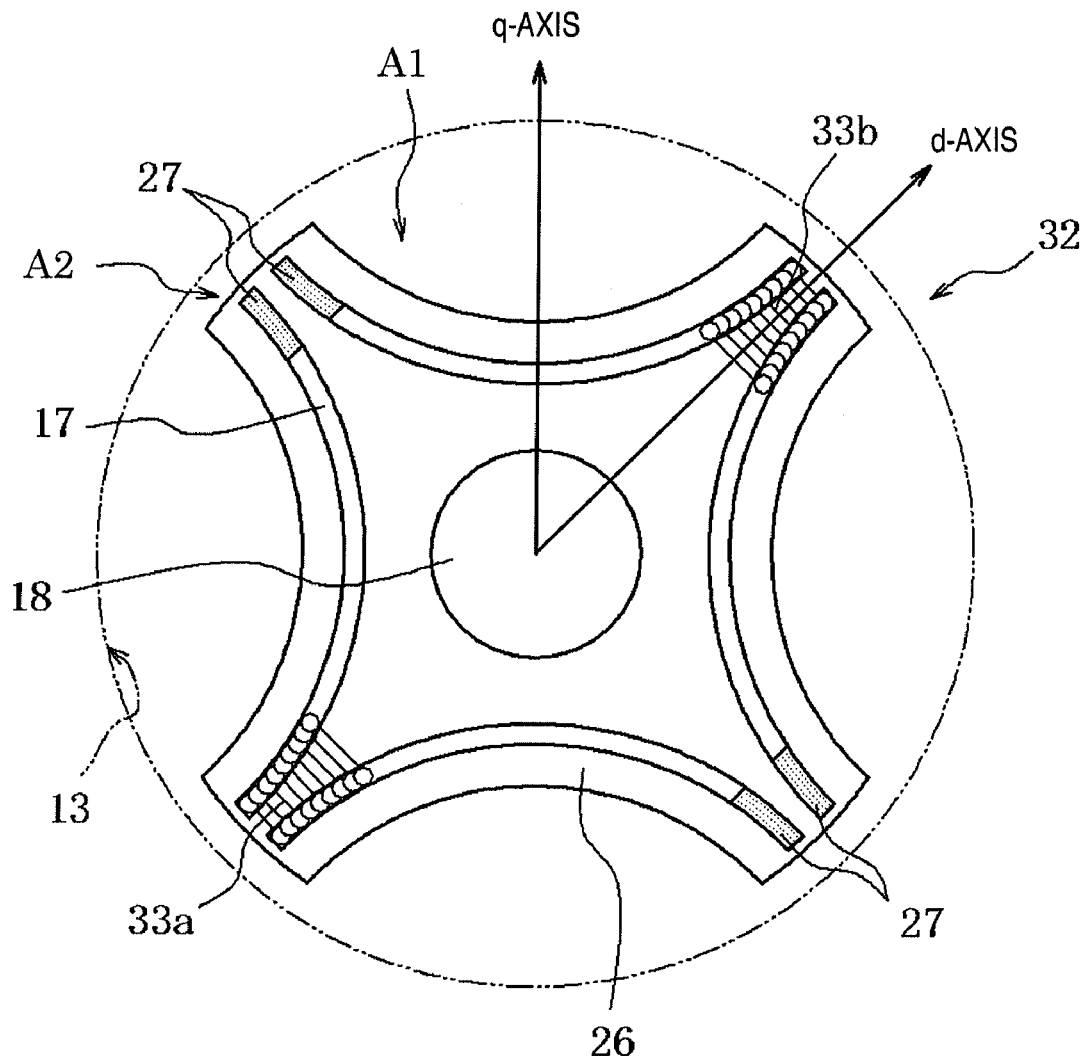
FIG. 12 is a top plan view of a variation of the rotor.
Figure 13:
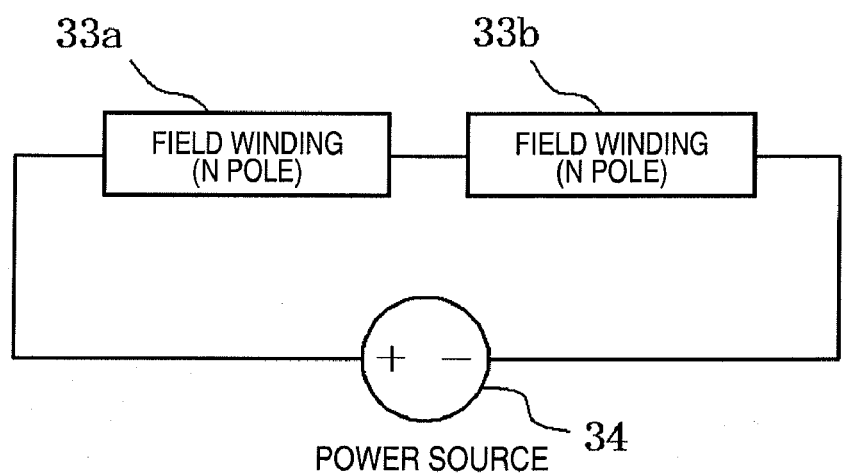
FIG. 13 is a circuit diagram of the magnetic flux generating circuit for the rotor of FIG. 12.

Variations of the embodiments described above can be obtained by replacing the permanent magnets arranged in the rotor core with coils. FIGS. 12 and 13 illustrate such a variation of the rotor. FIG. 12 is a top plan view of the rotor and FIG. 13 is a circuit diagram of the magnetic flux generating circuit. As shown in FIG. 12, the rotor 32 comprises a rotor core 26, a plurality of permanent magnets 27, and coils (magnetic field windings) that replace some of the permanent magnets. The rotor 32 is shaped, for example, like a four-pointed star in a plan view. More specifically, the N poles of the rotor core 26 are formed by field windings 33a and 33b and the S poles are formed by permanent magnets 27 (see FIG. 12). The field windings 33a and 33b forming the N poles are connected to an electric power source 34 and magnetic flux is generated by supplying a current to the field windings 33a and 33b (see FIG. 13). The shape of the rotor core is not limited to a four-pointed star shape. It is acceptable for the rotor core to be circular (see FIG. 1) or some other shape.

Thus, as described heretofore, the motors of the illustrated embodiments basically comprise a stator, a rotor, at least one low permeability layer and a current control device. The stator includes a stator core made of a magnetic material and a stator winding. The rotor includes a rotor core and a plurality of permanent magnets arranged in permanent magnet pairs with at least a first pair of the permanent magnets forming an N pole and at least a second pair of the permanent magnets forming S pole. The low permeability layer has a lower magnetic permeability than the rotor core and extends between each of the permanent magnet pairs in a direction generally parallel to the magnetic flux paths of the permanent magnets such that the permanent magnets and the low permeability are arranged to obstruct the magnetic flux between the permanent magnet pairs to provide a forward salient pole characteristic. The current control device is configured to produce a current whose phase is shifted such that the magnetic flux of the permanent magnets intensifies.

In certain illustrated embodiments, it is preferable for the low permeability layers to be arranged in at least three rows along directions generally perpendicular to the directions of the magnetic flux of the permanent magnets and for each of the sections of the rotor core disposed between two low of the permeability layers to include a core section in which one of the permanent magnets is arranged and a core section in which the permanent magnet is not arranged.

In certain illustrated embodiments, it is preferable for the permanent magnets arranged in a core section between two low permeability layers to be arranged on a surface of the rotor.

In certain illustrated embodiments, it is preferable for an air gap distance between the stator and a magnetic flux emanation surface formed by the permanent magnet on a surface of the rotor to be smaller than an air gap distance between the stator and any part of the rotor other than the magnetic flux emanation surface.

In the illustrated embodiments, it is preferable for the stator winding to be a distributed winding provided with a phase having two or more grooves per one pole.

In certain illustrated embodiments, it is preferable for the low permeability layer to comprise a layer of air.

In certain illustrated embodiments, it is preferable for the low permeability layer to comprise a layer of an adhesive material.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The terms of degree such as "generally". "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, various combinations of the first to fourth embodiments and configurations in which a permanent magnet has been replaced with a coil are included in the scope of the invention. Also for example, the size, shape, location or orientation of the various components can be changed as needed and/or desired. Components that are shown directly connected or contacting each other can have intermediate structures disposed between them. The functions of one element can be preformed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A motor comprising:
a stator including a magnetic stator core and a stator winding;
a rotor including a rotor core and a plurality of permanent magnets arranged to form north(N) and south (S) poles of the rotor;
a plurality of low permeability layers arranged in sequential rows with each of the low permeability layers being positioned at a different radial distance from a center of the rotor core such that at least one of the magnets is positioned along a path that extends between two directly adjacent low permeability layers and at a different radial distance from the center of the rotor than the directly adjacent low permeability layers, and each of the low permeability layers has a lower magnetic permeability than the rotor core and extends between respective ones of the N and S poles in a direction generally parallel to the magnetic flux paths of the permanent magnets, such that the permanent magnets and the low permeability layers are arranged to obstruct the magnetic flux between the N and S poles to provide a forward salient pole characteristic; and a current control device configured to produce a current whose phase is shifted such that the magnetic flux of the permanent magnets intensifies.

2. The motor as recited in claim 1, wherein
the rows are arranged in a perpendicular direction to magnetic flux paths of the permanent magnets.

3. The motor as recited in claim 1, wherein
one of the permanent magnets is sandwiched between an adjacent pair of the low permeability layers in each of the rows.

4. The motor as recited in claim 2, wherein
at least three of the low permeability layers are arranged in the sequential rows; and
the permanent magnets are arranged with respect to the low permeability layers such that a rotor core area free of the permanent magnets is formed between adjacent ones of the low permeability layers.

5. The motor as recited in claim 1, wherein
the permanent magnets are arranged on an outer circumferential surface of the rotor arranged in rotor core areas between the low permeability layers.

6. The motor as recited in claim 1, wherein
the stator winding is a distributed winding provided with a phase having two or more slots per one pole.

7. The motor as recited in claim 1, wherein
the low permeability layers comprise layers of air.

8. The motor as recited in claim 1, wherein
the low permeability layers comprise layers of an adhesive material.

9. The motor as recited in claim 1, wherein
each of the low permeability layers between each of the N and S poles extends along a direction of the magnetic flux paths of the permanent magnets; and
the permanent magnets are arranged inside the low permeability layers, with the permanent magnets being magnetized along a direction perpendicular to the direction along which the low permeability layer extend.

10. The motor as recited in claim 9, wherein
the stator winding is a distributed winding provided with a phase having two or more slots per one pole.

11. The motor as recited in claim 9, wherein
each of the low permeability layers comprises a layer of air.

12. The motor as recited in claim 9, wherein
each of the low permeability layers comprises a layer of an adhesive material.

13. The motor as recited in claim 1, wherein
each of the N and S poles are formed by a pair of the permanent magnets.

14. The motor as recited in claim 1, wherein
the low permeability layers are positioned to avoid intersecting any directions of the magnetic flux paths of the permanent magnets.

15. The motor as recited in claim 1, wherein
at least one of the magnets is positioned between two directly adjacent low permeability layers.

* * * * *